(12) United States Patent
Roberson

(10) Patent No.: US 6,883,985 B2
(45) Date of Patent: Apr. 26, 2005

(54) PRINTABLE, REUSABLE KEY MASKS

(76) Inventor: Robin Catherine Roberson, 18625 Midway Rd. #1103, Dallas, TX (US) 75287

( * ) Notice: Subject to any disclaimer, the term of this patent is extended or adjusted under 35 U.S.C. 154(b) by 0 days.

(21) Appl. No.: 10/376,023

(22) Filed: Feb. 26, 2003

(65) Prior Publication Data

US 2003/0161672 A1 Aug. 28, 2003

Related U.S. Application Data

(60) Provisional application No. 60/359,390, filed on Feb. 26, 2002.

(51) Int. Cl.[7] .............................. B41J 5/12; G09F 3/10; G06F 3/02
(52) U.S. Cl. ................... 400/490; 400/493; 400/714; 434/227; 341/22; 341/27; 428/40.1
(58) Field of Search ...................... 400/490, 493.1, 400/493.2, 484, 483, 714, 713, 491, 493; 434/227, 231, 233; 341/22, 23, 27, 28; 200/304, 333; 428/40.1, 42.1

(56) References Cited

U.S. PATENT DOCUMENTS

| | | | |
|---|---|---|---|
| 527,112 A | 10/1894 | Harte | |
| 726,107 A | 4/1903 | Stanton | |
| 2,435,130 A | 1/1948 | Cunningham | |
| 3,648,394 A | 3/1972 | Hepner | |
| 3,871,506 A | 3/1975 | Von Luders | |
| 4,042,090 A | 8/1977 | Hasebe et al. | |
| 4,248,917 A | * 2/1981 | Hornibrook et al. | 428/41.1 |
| 4,755,072 A | 7/1988 | Hoornweg | |
| 4,940,346 A | 7/1990 | Liljenquist | |
| D331,575 S | 12/1992 | Pike | |
| 5,183,346 A | 2/1993 | Tesar | |
| 5,290,115 A | * 3/1994 | Little | 400/491 |
| 5,324,380 A | * 6/1994 | Marin | 156/247 |
| D358,383 S | 5/1995 | Wagstrom | |
| 5,452,960 A | 9/1995 | Kuhlenschmidt | |
| D368,708 S | 4/1996 | Maynard et al. | |
| 5,626,429 A | 5/1997 | Choate | |
| 5,700,097 A | 12/1997 | Kuhlenschmidt | |
| 5,829,790 A | * 11/1998 | Phillips | 283/117 |
| 6,024,386 A | * 2/2000 | Spector | 283/117 |
| 6,084,644 A | * 7/2000 | Atkinson | 348/734 |
| D444,475 S | 7/2001 | Levey et al. | |
| 6,331,083 B1 | * 12/2001 | Harris | 400/493 |
| 6,382,854 B2 | 5/2002 | Morelos | |
| 6,419,494 B1 | * 7/2002 | Theismann et al. | 434/227 |
| 6,489,387 B2 | * 12/2002 | Mallya et al. | 524/394 |
| 6,544,714 B1 | * 4/2003 | Bourdelais et al. | 430/263 |
| 2001/0031167 A1 | 10/2001 | Morelos | |

FOREIGN PATENT DOCUMENTS

| EP | 0 118 250 A2 | * 9/1984 |
|---|---|---|
| GB | 2 386 098 A | * 9/2003 |

* cited by examiner

*Primary Examiner*—Leslie J. Evanisko
(74) *Attorney, Agent, or Firm*—Storm LLP; John G. Fischer

(57) ABSTRACT

A functional and decorative key mask is disclosed that is printable and has a uniquely functional geometry for easy and clean removable attachment to the keyfaces of a keyboard or keypad. The materials and design combine to provide a durable and reusable key mask. In the preferred embodiment, the key mask is has a body and a tab extending outward, and a pressure sensitive adhesive adhered to the back surface. It is die-cut from a face stock that is attached by the adhesive to a coated release liner. Mask sets include several key masks having similar or individualized graphic illustrations that enable the user to make unique associations with the keys of the keyboard or keypad, and thus enhance their learning, skill, performance, and enjoyment of a standard keyboard or keypad, or one having specialized key assignments.

21 Claims, 9 Drawing Sheets

PRINTABLE, REUSABLE KEY MASKS

CROSS-REFERENCE TO RELATED APPLICATION

This Application claims priority to U.S. Provisional Application 60/359,390 filed Feb. 26, 2002.

BACKGROUND OF THE INVENTION

1. Technical Field

The present invention relates to keypad and keyboard accessories and in particular to keypad and keyboard covering devices. More specifically, the present invention relates to functional and decorative keyface decals (hereinafter "key masks") having variable graphic designs, a uniquely functional geometry, and being reusable, and removably attachable to the keyfaces of a keyboard or keypad.

2. Description of Related Art

The revolution in the personal computer market and electronics in the 1980's has led to mass production of keyboards and keypads to which Americans and people all over the world interact daily. The public shares keypads for telephones, secured entrances, automatic teller machines, gas pumps, retail outlets, libraries, government buildings, building directories, financial institutions, and in numerous other applications. In schools at all levels, from preschool to graduate school, computers are shared by students. Employees use keypads and keyboards in increasing numbers, from computers to machine controllers. A large majority of all homes now have a personal computer for family use.

Keyboard layouts have been standardized for years. At the same time, computers have become, and will continue to be, increasingly sophisticated over time. It is now a standard function of computers to enable short-cut key assignments and reassignment of keys. The problem is that the key labels remain unchanged, failing to identify the short-cut key assignment or reassignment of the actual keys. Removal and replacement of the keys is cumbersome and not always possible, depending on key skirt clearances. The present computer keyboard design is limited to the alphanumeric symbols, limiting the potential learning associations to the standard key characters.

The arrangement of the computer keys appears random to anyone who has not been trained in typing. The problem of locating the correct keys is a primary source of reduced productivity, frustration, delay, and disillusionment with the use of computers. Furthermore, when teaching students to type, it is advantageous to be able to cover the indices on the keys without interfering with performance of the keyboard.

The problem of finding the correct key is understandably worse for children who have just learned the alphabet, making the search for letters beyond the patience and attention span of most children. To children, it appears that the keys have been purposely mixed-up. The keyboard is a dull, confusing, utilitarian piece of equipment. When teaching children to type, it would be advantageous to provide more and varied associations beyond the bland capital letter on the key face.

Computer gaming is a multi-billion dollar industry. In 1997, the Cyberathlete Professional League® was formed, and now hosts international computer gaming tournaments for professional computer gamers with large prize and cash awards. Computer games require engagement of specific keys to be used for certain functions necessary to play the games. This requires memorization of the association between a standard alphanumeric key and the assigned function. This obstacle inhibits the user's performance and diminishes the enjoyment of the software.

In addition to the problem of specific key assignments needed for a game's play, most computer game players play several different games. The game programs are so diverse and varied that commonality between key strokes and functions is rare. Trying to remember the key assignments for each game becomes impossible. Thus, even specially marking a key would only apply to one game.

It has become popular to create music on computers, and there are many software programs for doing so commercially available. As with computer games, it is necessary to memorize the association between a standard alphanumeric key and the assigned musical function. This obstacle inhibits the user's performance and diminishes the enjoyment of the software.

Many computers are used to control sophisticated pieces of equipment. The limitations of the keyboard, in part, have given rise to the popularity of touch screens with identifiable representations of the function associated with touch, or key stroke. The risk of incorrect association of a standard key with the function is unacceptable in these applications.

Along with increased public use of computers, new issues of sanitation and microbial contamination have arisen. This is particularly a problem with keyboards in schools. Most keyboards are not readily washable, and the collection and growth bacteria on their surfaces is unabated. Contact with the fingertips of multiple users results in cross-contamination at a site of the body most likely to come into contact with food, and with other susceptible locations of the body.

Keyboard templates are well known. These devices fit over the keyboard and are designed to provide associations between keys and functions other than the indicators marked on the key. One disadvantage of these devices is that they are limited to providing associations from the perimeter of the primary keypad. Thus, they cannot provide close visual indications of the function associated with central keys. Another disadvantage of these devices is that even as to keys to which the template is proximate, it is necessary to make a separate visual contact with the template and with the key itself. Another disadvantage of these devices is that they are large and cumbersome, and often unstable as they sit on the keyboard. Another disadvantage of these devices is that they cannot fit on more than a single keyboard design.

Numerous attempts have been made to overcome these and other disadvantages. U.S. Pat. No. 6,382,854 B2 issued to Morelos, discloses a computer keyboard enhancement kit that includes a bib-shaped jacket made of a transparent plastic sheet. The sheet has the width of a standard computer keyboard, thrice the length of it and a plurality of rows of adhesive strips and rubber pads permanently attached to the sheet. The kit also includes detachable key replacements made of rubber material, having enlarged surfaces and of various colors and shapes.

U.S. Pat. No. 6,331,083 B1 issued to Harris, discloses key covers for individual keys of a computer keyboard, with each key cover having a colored background and a fluorescent letter of a contrasting color. The key covers each consist of a flat rectangular piece of plastic material of the same size as the key to be covered, and of an adhesive bottom surface that allows for attachment and removal.

U.S. Pat. No. 5,700,097 issued to Kuhlenschmidt, discloses a children's computer keyboard with enlarged keys that are color-coded according to function groups: a numerical key group, an alphabetical key group, a programmable function key group, a punctuation and text-editing key group, and a cursor control key group. The enlarged keys are designed with a wider top surface and area between the keys than a conventional computer keyboard.

U.S. Pat. No. 5,626,429 issued to Choate, discloses a keyboard arrangement designed to maximize the speed and efficiency of training by color matching the keys to be reached by a specific finger. Keys from a QWERTY keyboard are removed and replaced in a different arrangement to create keyboards more suitable for right-handed or left-handed individuals, arthritic, and limited hand-use typists.

U.S. Pat. No. Des. 358,383 issued to Wagstrom, discloses and claims the ornamental design for a children's computer keyboard with large colorful alphabetically arranged keys, and large diamond-shaped cursor keys.

U.S. Pat. No. 5,290,115 issued to Little, discloses a cushioning apparatus for reducing the impact felt by the fingertips of a typist using a keyboard. This cushioning apparatus consists of a plurality of separate pads, each shaped and sized to fit onto a predetermined key, and each having adhesive material applied to the flat bottom surface of the pad for attachment and removal.

U.S. Pat. No. 5,183,346 issued to Tesar, discloses a keycap overlay snap-on system for converting the graphic symbols on a computer data entry keyboard to a different set of graphic symbols, such as scientific symbols or foreign language characters. The invention consists of a plurality of keycaps, each keycap consisting of a top rectangular surface that corresponds in size and shape to the upper exterior surface of the data entry key over which it is to be positioned.

U.S. Pat. No. Des. 331,575 issued to Pike, discloses and claims the ornamental design for a computer keyboard decal that is substantially wider than it is tall, wrapping over the top and down the sides of keys.

These devices have numerous disadvantages, including cost to manufacture, difficulty of installation and removal, and impractically of covering less than all of the keys of the keypad or keyboard to achieve a uniform structure. A principal disadvantage of these devices is that those employing the use of adhesives lack a means for handling the devices, resulting in difficulty of use and contamination of the adhesive which reduces the adhesive shear strength and shortens the life of the device. Another disadvantage of these devices is that the adhesives and materials used to produce them make removal of the stickers difficult, and reuse impossible. Another disadvantage of these devices is that since they are sized to fit exactly on the keyface, they are difficult and time consuming to align and install. Another disadvantage of some of these devices is that if they are sized to fit exactly on the keyface, or oversized to wrap over the key and down the sides, there is nothing to grasp when trying to remove them, making removal difficult and time consuming. A typical result of this disadvantage is that the user will have to scratch them off, destroying the sticker such that it cannot be reused. An additional result of this disadvantage is that adhesive and paper residue is often left behind on the keyface, creating a mess. Another disadvantage of these designs is that even if removed successfully, the sticker becomes distorted and curled, making reuse impractical. This problem is exasperated by the concave keyface surfaces used on standard keyboards and many keypads. Another disadvantage of these designs is that since they cannot be reused, it is necessary to keep additional stickers in stock, at additional cost, in order to use them again.

While these devices may fulfill their respective, particular objectives and requirements, the aforementioned patents do not disclose a key mask set for a keyboard having the advantageous geometric or material properties of the present invention. Thus, it is seen that there is a need for an improved system for optionally and variably identifying keys on a keyboard or keypad in a manner that permits easy installation, removal, and reuse.

BRIEF SUMMARY OF THE INVENTION

A primary advantage of an embodiment of the present invention is that it provides an indicator means for direct association of software assignable functions to the assigned keys of a keyboard. Another advantage of an embodiment of the present invention is that it provides a disposable prophylactic means of preventing transmission of contagious diseases through fingertip contact with contaminated keys on a keypad or keyboard. Another advantage of an embodiment of the present invention is that it is easily installed and easily removed. Another advantage of an embodiment of the present invention is that it provides a means for modifying a standard keyboard to provide immediate association with actions performed when playing computer games. Another advantage of an embodiment of the present invention is that it provides a means for modifying a standard keyboard to provide immediate association with musical notes for operating music related software. Another advantage of an embodiment of the present invention is that it provides an inexpensive means for modifying a standard keyboard to provide an entertaining interface for children to learn to operate computers. Another advantage of an embodiment of the present invention is that it provides an inexpensive means for modifying a standard keyboard to provide immediate association with equipment functions for operating equipment that is connected to the computer. Another advantage of an embodiment of the present invention is that it is reusable. Another advantage of an embodiment of the present invention is that it is inexpensive. Other advantages of the present invention will become apparent from the following descriptions, taken in connection with the accompanying drawings, wherein, by way of illustration and example, an embodiment of the present invention is disclosed.

The above described advantages are not to be construed as being collectively present in any one given embodiment of the invention, but rather understood to be obtained individually in some degree by one or more, or by a specific combination of two or more of the embodiments disclosed. Likewise, each individual embodiment is not necessarily associated with a specific advantage.

Features of the invention that will be described hereinafter and which will form the subject matter of the claims appended hereto. It is to be understood that the invention is not limited in its application to the details of construction and to the arrangements of the components set forth in the following descriptions or illustrations. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

In the preferred embodiment of the present invention, a mask set is made up of a plurality of die-cut key masks located on a face stock. The key masks are die-cut from the face stock. In a preferred embodiment, the face stock is made from lithographic paper stock having a matte finish, and a basis weight of approximately 60 pounds. In another preferred embodiment, the face stock has a caliper thickness of approximately 0.034 inches.

In another preferred embodiment the key mask has a graphical illustration on its top surface. In the preferred embodiment, the graphical illustrations are created by the process of flexography. Also in the preferred embodiment, the inks used for printing graphic illustrations on key masks are chromate-free water-based printing inks complying with the CONEG Model for heavy metals content, and with ASTM Standard Consumer Safety Specifications on safety and the U.S. Federal Standard 18 CFR 1303.

In another preferred embodiment the key mask has a body that is substantially rectilinear, and a tab extending diagonally outward from a corner of the body. Preferably, the body substantially matches the dimensions of a keyface on a standard keyboard, and the tab is oriented and sized so as to avoid interference with adjacent keys.

In the preferred embodiment, a pressure sensitive adhesive is adhered to the bottom surface of the face stock (and thus, of key masks). The pressure sensitive adhesive adheres the face stock to the coated side of a silicone coated liner. In the preferred embodiment, the pressure sensitive adhesive is a clear acrylic, removable adhesive, having a high shear and high removable adhesion. Also in the preferred embodiment the liner is made from paper stock that has a basis weight between approximately 100 and 110 pounds. It is also preferred that the liner is made from paper stock that has a caliper thickness of approximately 0.008 inches.

In another embodiment, the key masks of a set are opaque, and provide a device for blocking the operator's view of the letters on a keyboard, for use in typing training. In another embodiment, the key masks of a set included colorful alphanumeric representations for helping children learn to use keyboards. In another embodiment, the key masks of a set include graphic illustrations of distinct musical notes for use with music related software. In another embodiment, the key masks of a set include graphic illustrations representing distinct character movements related to an interactive computer game. In another embodiment, the key masks of a set include graphic illustrations representing operative functions of a system or machine.

BRIEF DESCRIPTION OF THE SEVERAL VIEWS OF THE DRAWING(S)

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
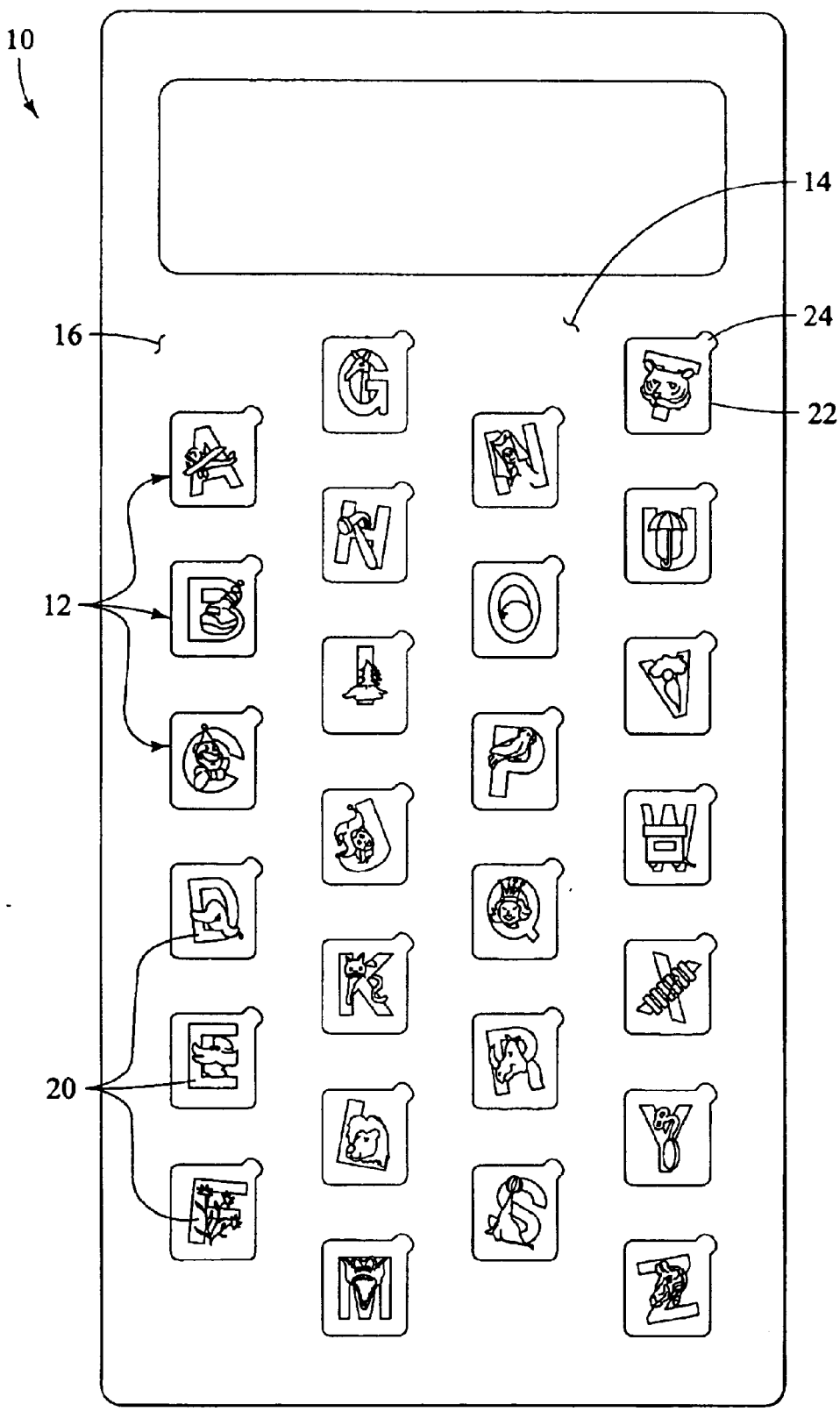
FIG. 1 is a top view of a preferred embodiment of the present invention, disclosing a mask set for attaching to the keys on a keyboard.

FIG. 1 is a top view of a preferred embodiment of the present invention. In this view, a mask set 10 is disclosed. The mask set is made up of a plurality of die-cut key masks 12 located on a face stock 14. Face stock 14 and key masks 12 have a top surface 16 and an opposite bottom surface 18 (not visible in this view). As key masks 12 are die-cut from face stock 14, the material properties of key masks 12 are the same as those of face stock 14. In a preferred embodiment, face stock 14 is made from paper stock that has a basis weight between 50 and 70 pounds. In a more preferred embodiment, face stock 14 is made from paper stock having a basis weight of 60 pounds. Also in the preferred embodiment, face stock 14 is made from lithographic paper stock having a matte finish, and a caliper thickness of between 0.03 and 0.04 inches. The most preferred caliper thickness is approximately 0.034 inches. Experimentation has shown that these material properties, combined with the disclosed properties of other elements of the invention, contribute to providing many of the advantages of the present invention.

Figure 2:
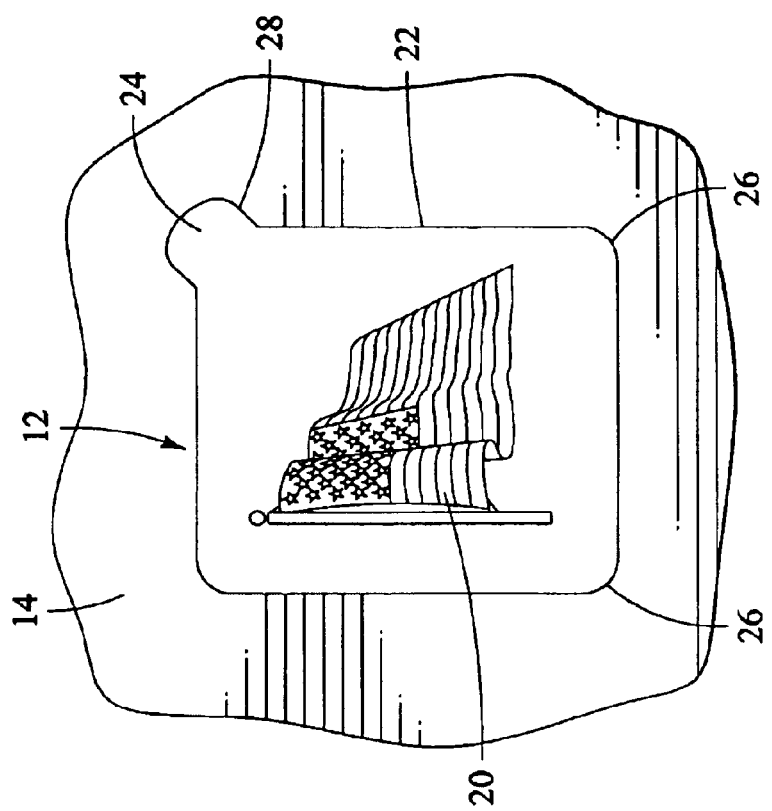
FIG. 2 is a top view of a preferred embodiment of the present invention, disclosing a key mask having a graphical illustration.

FIG. 2 is a top view of a key mask 12 on face stock 14. In this view, it is seen that key mask 12 has a graphical illustration 20 on its top surface 16. In the preferred embodiment, illustrations 20 are created by a printing process commonly known as flexography. Based on tests of various methods of creating graphic illustrations 20 of various paper products, it was determined that the flexography process is the process best suited for creating the images. Flexography is a printing process that uses a flexible material to transfer ink to a web or substrate. Liquid ink is transferred to an anilox roll. The anilox roll transfers the ink to a printing plate mounted on a plate roll. Relief image printing plates are made of a flexible material with a raised image. Liquid ink transfers from the anilox roll to the raised image on the printing plate to the web. Thus the process prints directly on the substrate, instead of offsetting the image to an intermediate roller as with convention printing presses. One advantage of flexography is that it can quickly print millions of impressions in a continuous operation with minimal paper waste due to the repeat length system. The inking system can deliver a predetermined amount of ink with minimum on-press adjustments, thus better quality control with fast turn-around time.

In another preferred embodiment, the inks used for printing graphic illustrations 20 on key masks 12 are chromate-free water-based printing inks. In the preferred embodiment, the inks used for printing the graphic images on key masks 12 comply with the CONEG Model for heavy metals content: namely that the sum of the concentration levels of lead, cadmium, mercury and chromium present in this systems do not exceed 100 parts per million by weight. Preferably, the inks used for printing the graphic images on the key masks satisfy ASTM Standard Consumer Safety Specifications on safety and the U.S. Federal Standard 18 CFR 1303.

Referring again to FIG. 2, each key mask 12 has a body 22 that is substantially rectilinear, and a tab 24 extending outward from a corner of body 22. In a preferred embodiment, body 22 is substantially rectangular. In the more preferred embodiment, body 22 is approximately 9/16 inches tall and approximately ½ inches wide, allowing it to substantially cover the top surface of a key on a standard keyboard. Also in the preferred embodiment, the corners of body 22 include a corner radius 26, thus matching closely to the keys of a keyboard. Experimentation has shown that these geometric features and dimensional properties, combined with the disclosed material properties or other elements of the invention, contribute to providing many of the advantages of the present invention. In particular, these features allow key mask 12 to substantially cover the key of a standard keyboard; allow the key having key mask 12 attached to be depressed without interfering with adjacent keys; and allow key mask 12 to be separated from the face stock without tearing.

Still referring to FIG. 2, in another preferred embodiment, tab 24 extends from the upper right hand corner of body 22 of key mask 12. Preferably, tab 24 extends diagonally outward from a corner of body 22. This direction of extension places tab 24 in the position of least interference with adjacent keys on the keyboard. Also preferably, tab 24 is between 0.110 and 0.140 inches wide, and between 0.110 and 0.140 inches long. In the most preferred embodiment, tab 24 is approximately 0.125 inches wide and approximately 0.125 inches long, and has an end radius 28 at its distal end. Experimentation has shown that these geometric and dimensional properties, combined with the disclosed properties or other elements of the invention, contribute to providing many of the advantages of the present invention. In particular, these features allow key mask 12: to be depressed without interfering with adjacent keys; to be easily removed and easily installed without tearing; to be easily removed from face stock 14 without tearing; to be easily handled and positioned over a key face of a keyboard; and to be easily removed from a key face of a key on a keyboard.

Figure 3:
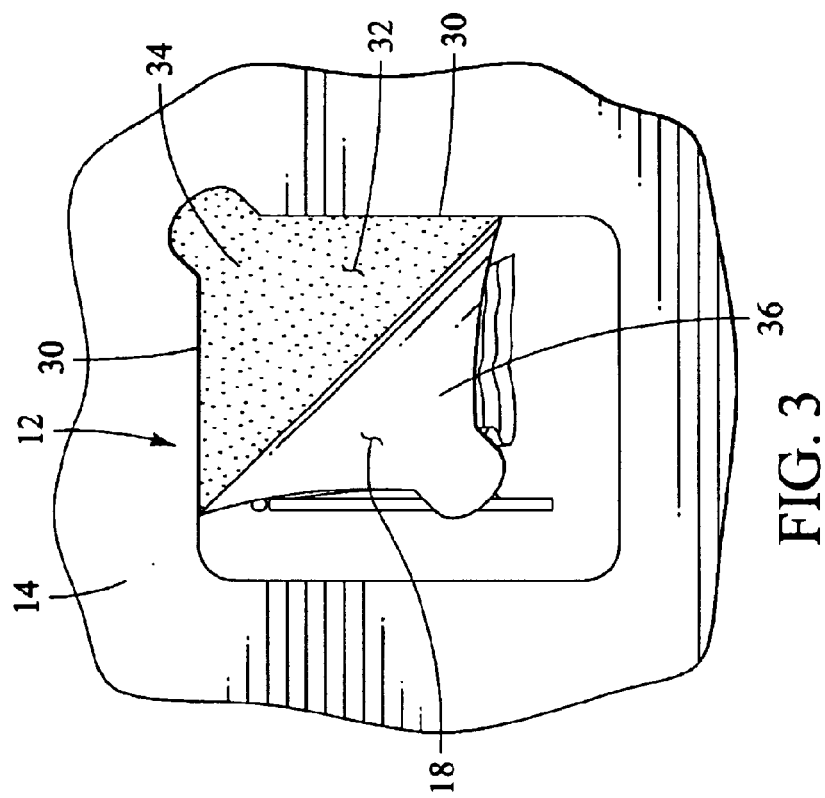
FIG. 3 is a top view of the key mask of FIG. 2, illustrating the key mask being removed from the face stock, and disclosing the underlying liner, liner coating, and adhesive backing on the face stock.

FIG. 3 is a top view of key mask 12 of FIG. 3, illustrating key mask 12 partially removed from face stock 14. In this view, it is seen that a die-cut 30 forms the separation between key mask 12 and face stock 14. Beneath key mask 12, and within the outline of die-cut 30, a release liner 32 is visible. The side of release liner 32 adjacent to face stock 14 has a coating 34. In the preferred embodiment, coating 34 is a silicone coating. It is preferred that liner 32 is made from paper stock that has a basis weight of between 90 and 120 pounds. In the most preferred embodiment, liner 32 is made from paper stock that has a basis weight between 100 and 110 pounds. It is preferred that liner 32 is made from paper stock that has a caliper thickness of between 0.007 and 0.009 inches. In the most preferred embodiment, liner 32 is made from paper stock that has a caliper thickness of 0.008 inches. Experimentation has shown that these properties, combined with disclosed properties or other elements of the invention, contribute to providing many of the advantages of the present invention.

Still referring to FIG. 3, a pressure sensitive adhesive 36 is adhered to bottom surface 18 of face stock 14, and of key mask 12. Pressure sensitive adhesive 36 adheres face stock 14 to the coating 34 on liner 32. In the preferred embodiment, pressure sensitive adhesive 36 is a clear acrylic, removable adhesive, having a high shear and high removable adhesion. Pressure sensitive adhesives having these specific properties are commercially available, such as TR440, which is available from Technicote∞, at 222 Mound Ave., in Miaimisburg, Ohio.

Figure 4:
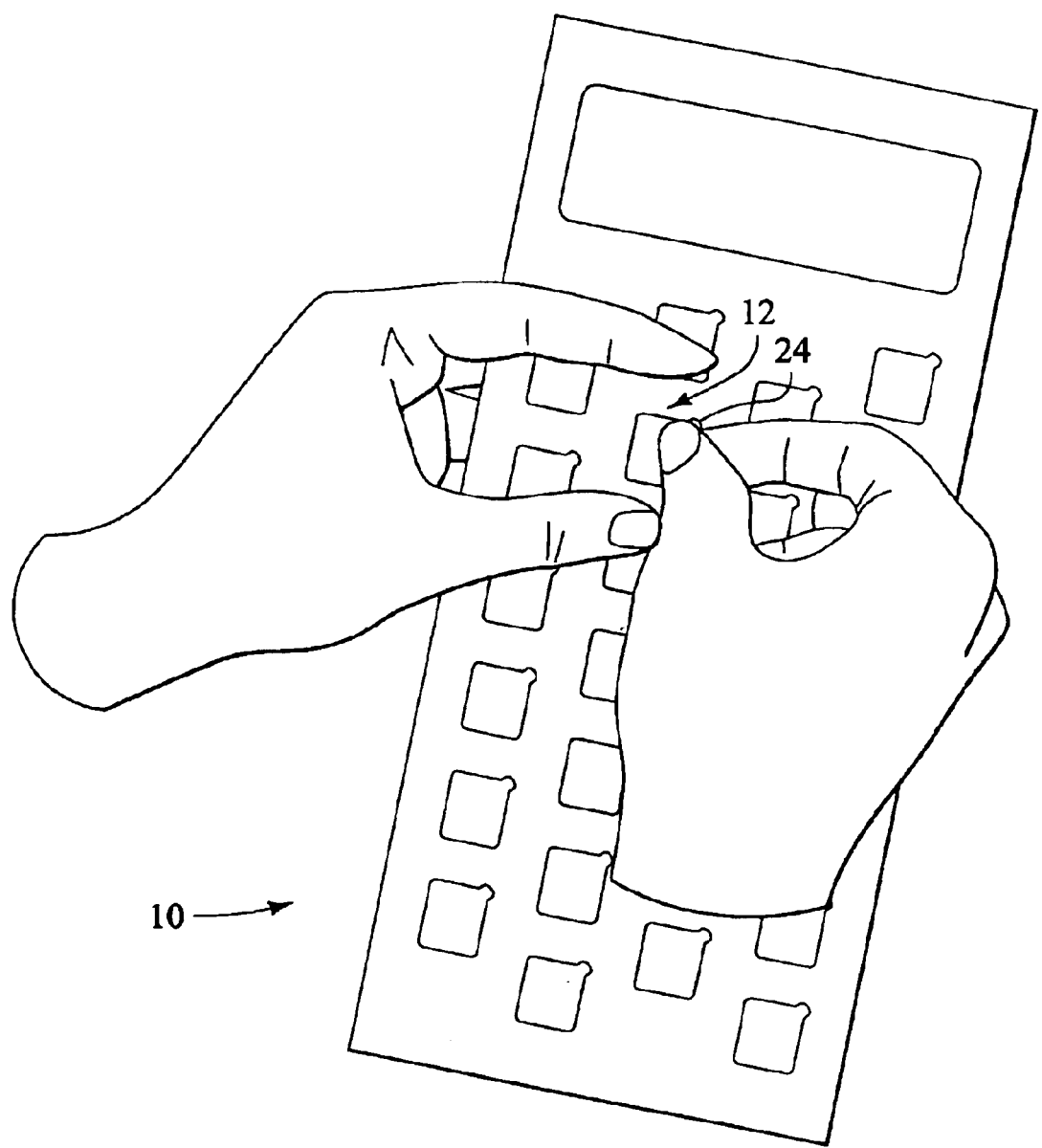
FIG. 4 is an isometric view of a preferred embodiment of the present invention, illustrating removal of a key mask from the mask set.

FIG. 4 is an isometric view of a preferred embodiment of the present invention, illustrating removal of a key mask 12 from mask set 10. In this view it can be seen that tab 24 provides an advantageous extension that is easily leveraged to initiate separation of key mask 12 from liner 32.

Figure 5:
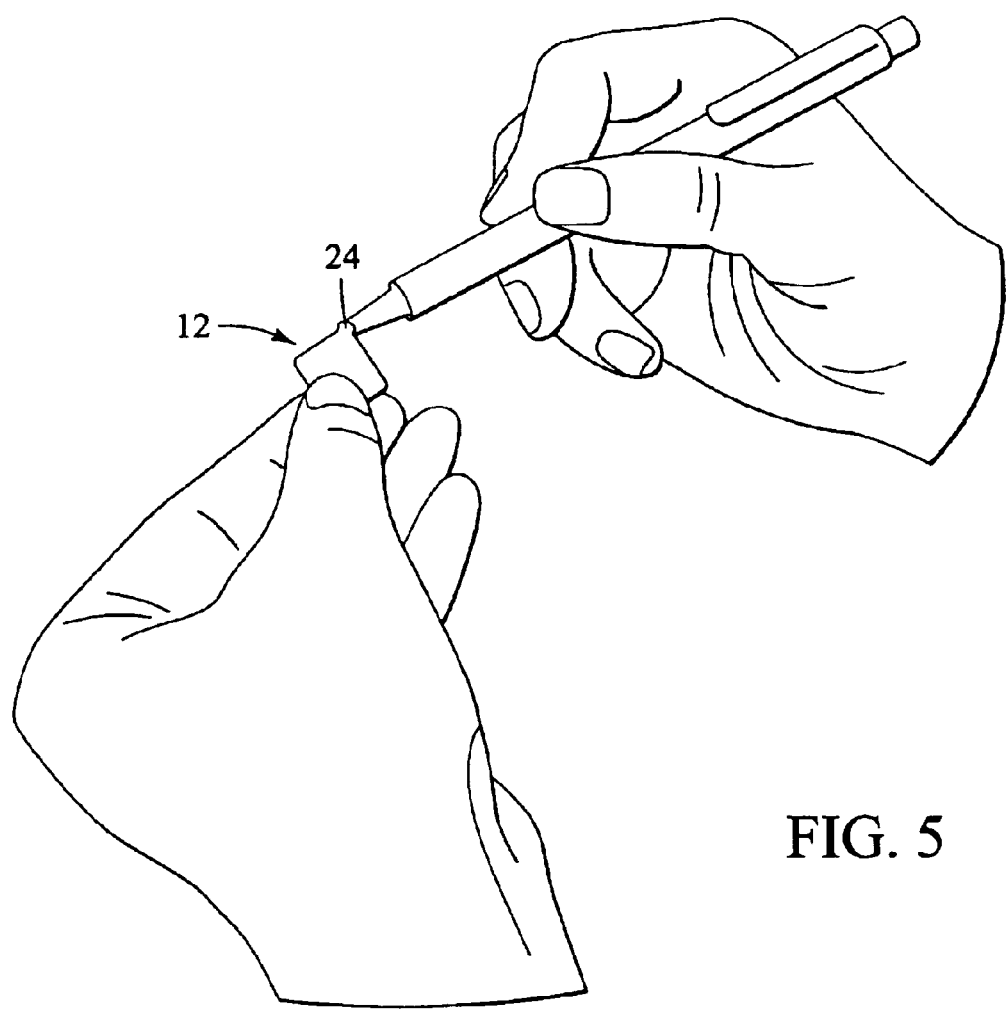
FIG. 5 is an isometric view of the embodiment of FIG. 4, illustrating the preferred method of handling a key mask prior to its placement on a key on a keyboard.
Figure 6:
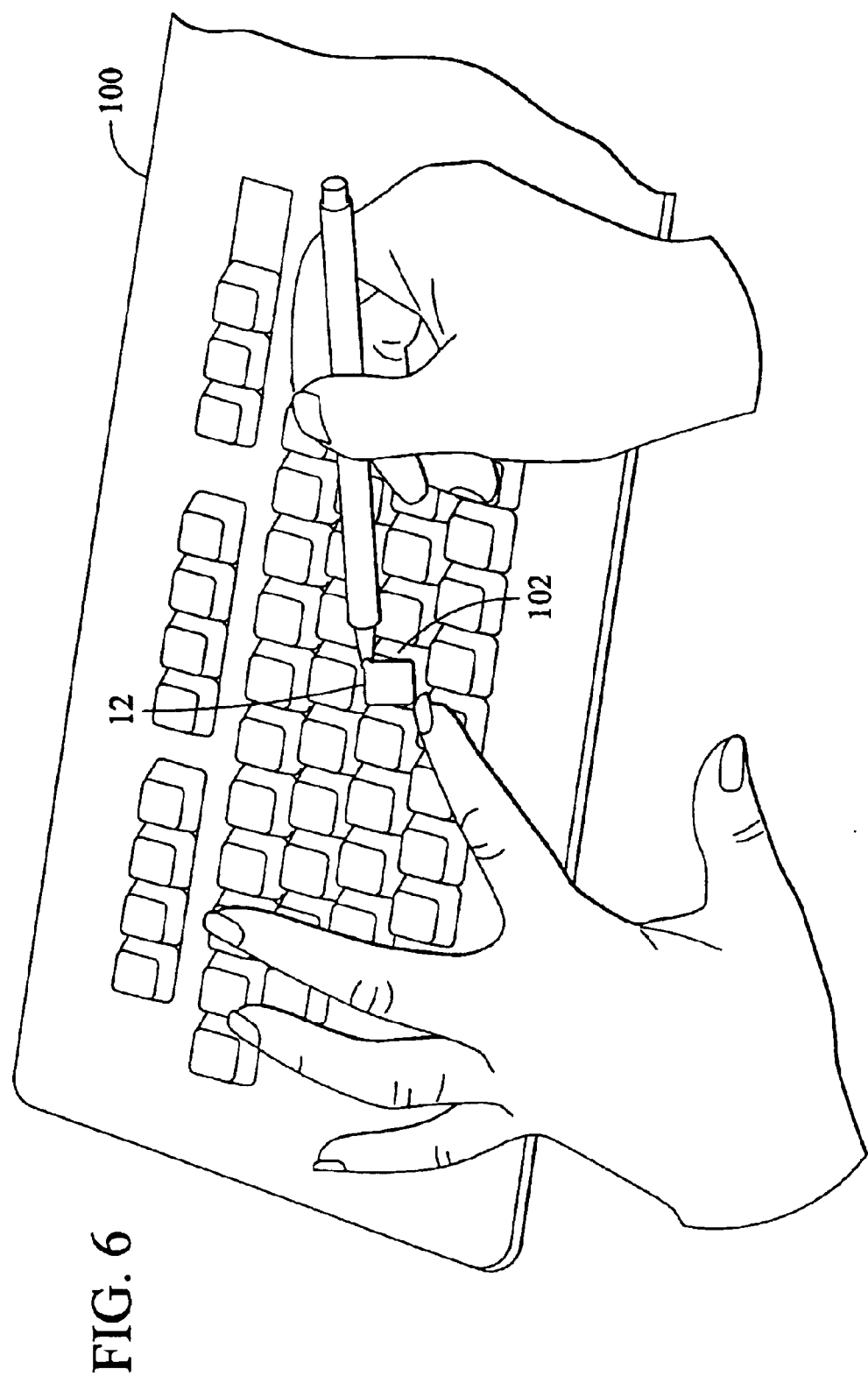
FIG. 6 is an isometric view of the embodiment of FIG. 4 and FIG. 5, illustrating the preferred method of placement of a key mask on a key on a keyboard.

FIG. 5 is an isometric view of the embodiment of FIG. 4, illustrating a preferred method of handling key mask 12 for location and placement on a key of a keyboard. When removing key mask 12 from liner 32, the bond between the coating 34 and adhesive 36 is broken. With the combination of the preferred material properties of face stock 14, adhesive 34, liner 32, and coating 34, key mask 12 can be easily relocated to liner 32 and stored for future reuse. Additionally, the oils in one's skin negatively affect the performance of adhesive 34, and contamination can prevent affective relocation of key mask 12 onto liner 32 for storage and reuse. Tab 24 permits touchless relocation of key mask 12 on a key 102 of a keyboard 100 (as shown in FIG. 6) and back onto liner 32. As in FIG. 4, it can be seen that tab 24 provides an advantageous extension for handling key mask 12.

FIG. 6 is an isometric view of the embodiment of FIG. 4 and FIG. 5, illustrating a preferred method of placement of key mask 12 on a key 102 of a keyboard 100.

Figure 7:
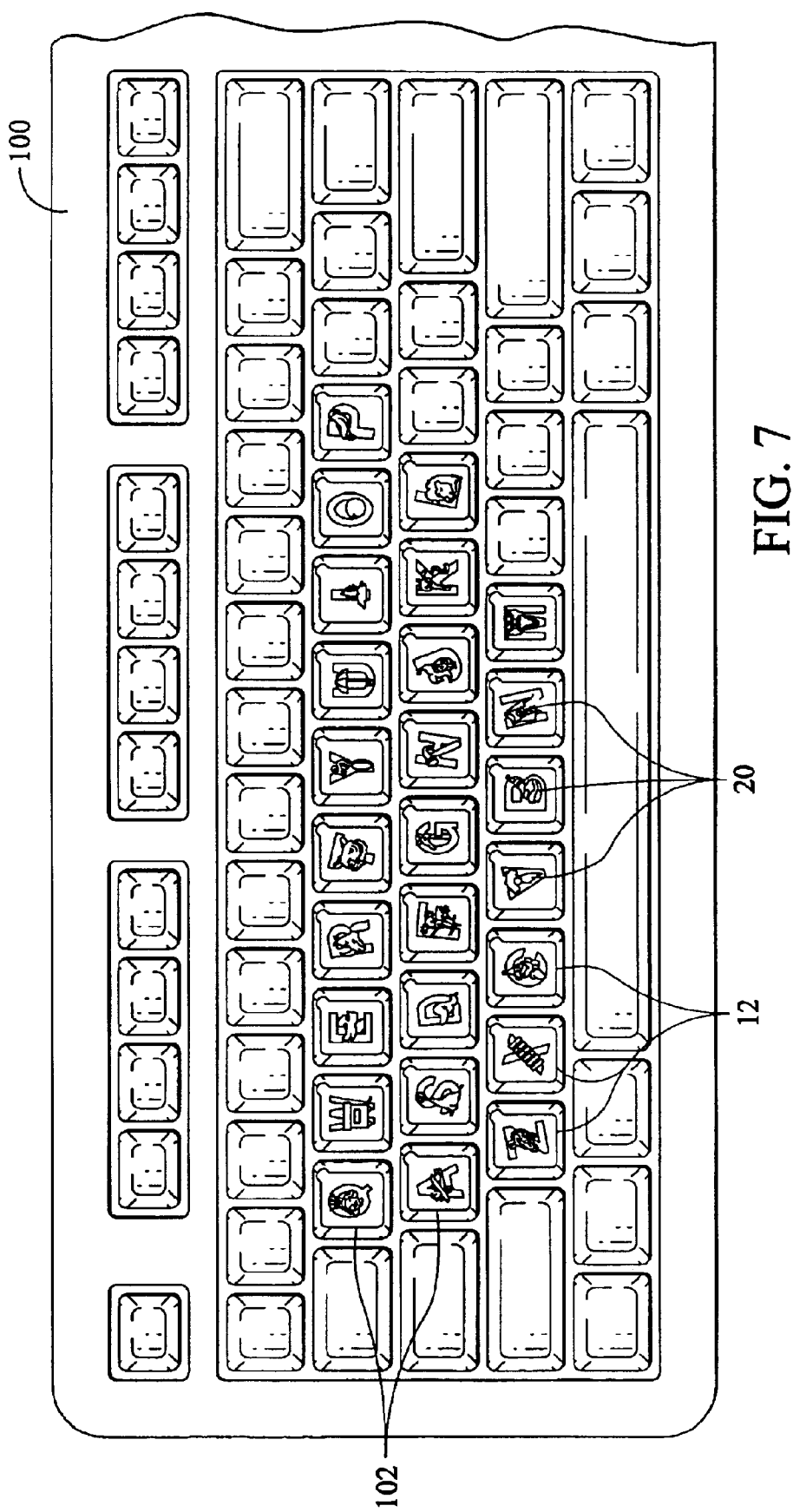
FIG. 7 is a top view of the embodiment of FIG. 1 after transfer of the key masks onto a keyboard.

FIG. 7 is a top view of the embodiment of FIG. 1 after placement of key masks 12 of mask set 10 onto keys 102 of keyboard 100. In this embodiment, key mask 12 provides a tool for teaching children reading and typing. Numerous studies have shown that when learning the alphabet, images make recognition of letter shapes easier. Conversely, when teaching typing, instructors may want students to see the letters initially, but when students reach a certain level of proficiency, instructors commonly cover the keys with tape. Key masks 12 can be used to provide intermediate association between blank keys and alphanumerically indicated keys. Key masks 12 can also be used to conveniently, and temporarily, cover the alphanumeric indications on keys 102. The use of graphic images 20 may be randomly used as well. Key masks 12 are easy to install, remove, and will not damage keyboards 100 of the school.

Figure 8:
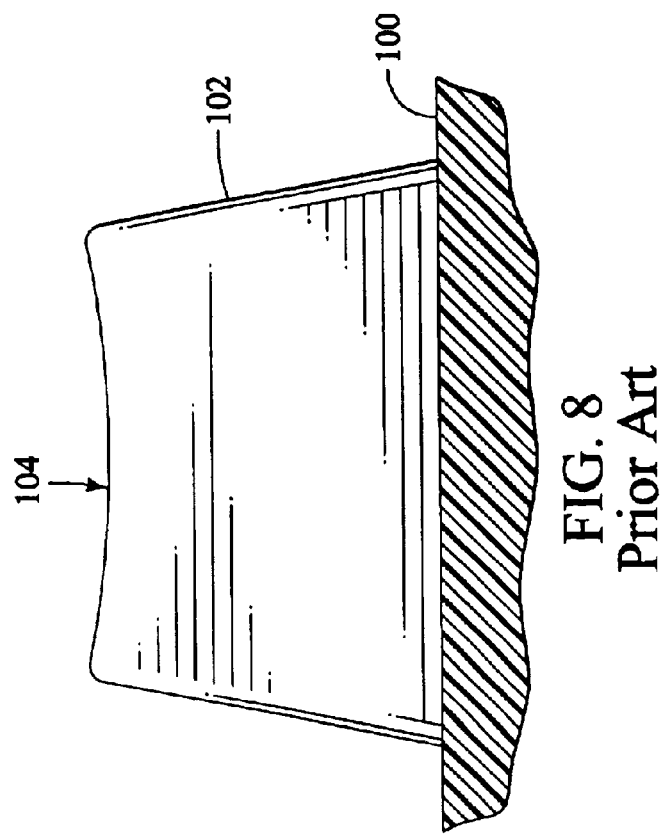
FIG. 8 is an end view of a typical key on a typical keyboard, illustrating the concave center.
Figure 9:
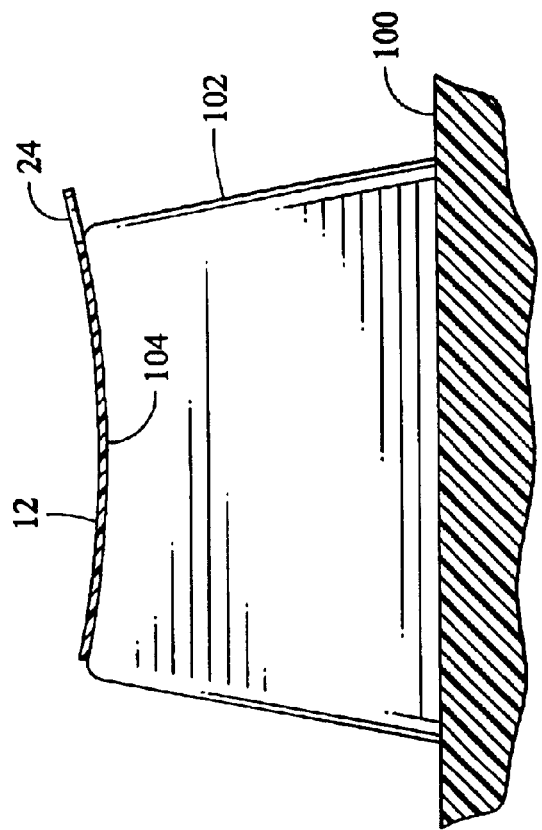
FIG. 9 is the end view of the key in FIG. 8, with a key mask attached to the face of the key.

FIG. 8 is a side view of a typical key 102 of a typical keyboard 100. In this view, it is seen that key 102 has a concave key face 104. The combined preferred material and dimensional properties of key mask 12 permit key mask 12 to flex in a manner complementary to the shape of key face 104. This is best seen in FIG. 9.

Figure 10:
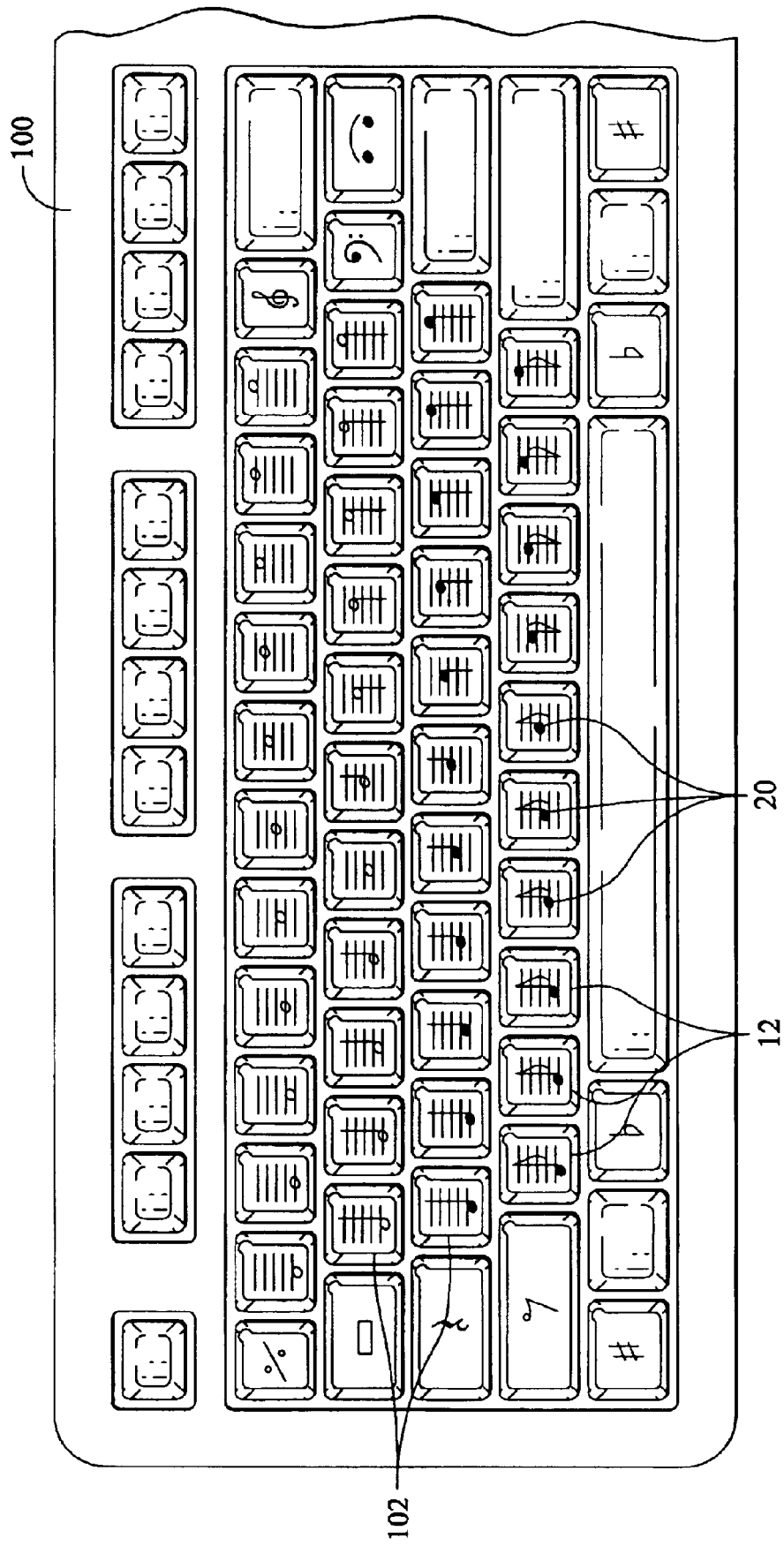
FIG. 10 is a top view of a keyboard having a mask set installed for use with music related software.

FIG. 10 is a top view of keyboard 100 having mask set 10 installed for use with music related software. In this embodiment, graphic illustrations 20 on individual key masks 12 represent distinct musical notes. This permits immediate association of the proper key 102 with a musical note, or a modifier of a note, such as flat, sharp, duration, of instrument played. This allows keyboard 100 to operate in much the same fashion as a synthesizer of other musical instrument, or alternatively, as a music composing device.

Figure 11:
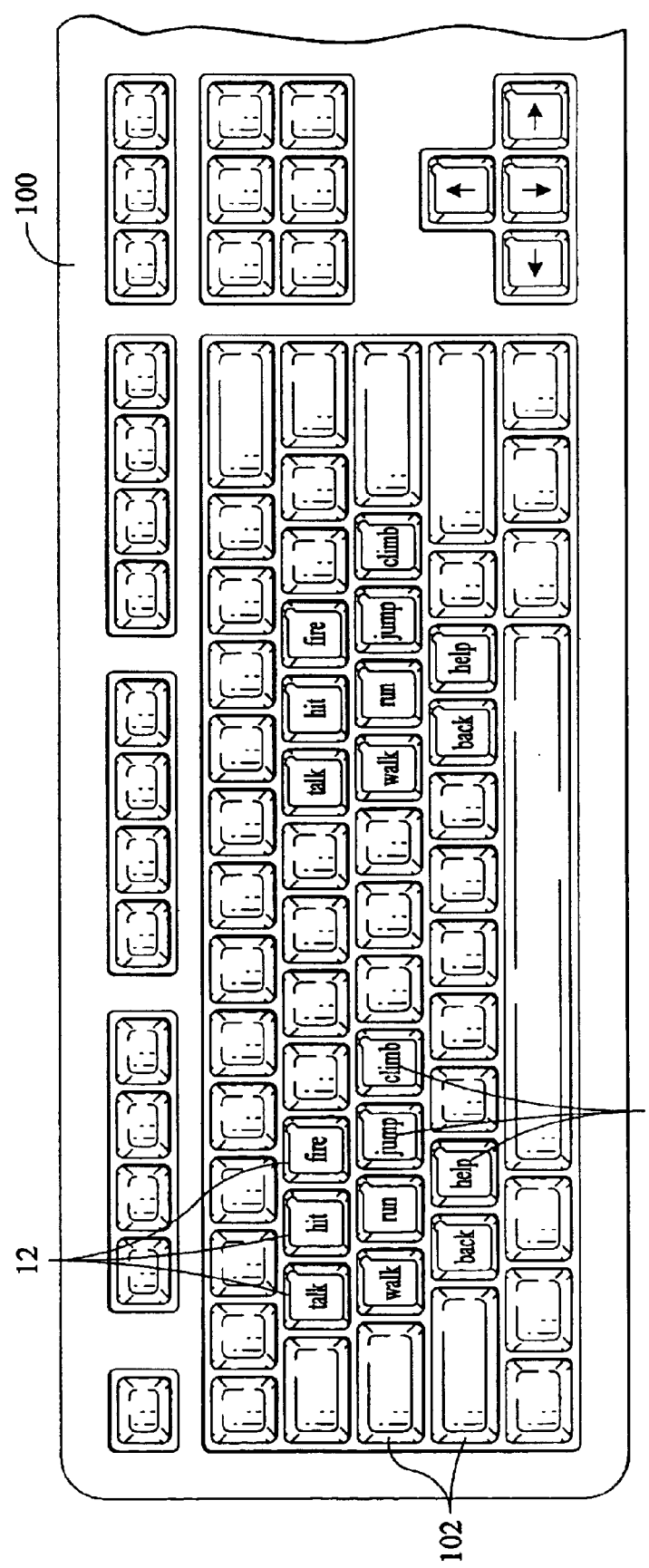
FIG. 11 is a top view of a keyboard having a mask set installed for use with interactive gaming software.

FIG. 11 is a top view of a keyboard having a mask set installed for use with interactive gaming software. In this embodiment, graphic illustrations 20 on individual key masks 12 represent player controls over the game, such as weapon selection, and character movements. This embodiment permits immediate association of the proper key 102 with a desired control, allowing a player to learn new game controls quickly, and play more successfully, without the obstacle of unidentifiable controls within keyboard 100.

In another embodiment, not shown, graphic illustrations 20 on individual key masks 12 represent control actions for equipment or a system, such as: flow on, flow off, temperature up, temperature down. This embodiment permits immediate association of the proper key 102 with a desired equipment or system control, allowing an operator to use the computer and keyboard 100 as a programmable process controller or recorder, without the obvious safety concerns associated with an operator's inability to associate the proper key 102 with the proper control function.

OPERATION OF THE INVENTION

In the preferred embodiment of the present invention, a mask set 10 is provided. Mask set 10 is made up of a plurality of die-cut key masks 12 located on a face stock 14. Face stock 14 and key masks 12 have a top surface 16 and an opposite bottom surface 18. In a preferred embodiment each key mask 12 has a graphical illustration 20 on its top surface 16. Each key mask 12 has a body 22 that is substantially rectilinear, and a tab 24 extending diagonally outward from a corner of body 22. Body 22 is designed to substantially cover the top surface of a key 102 on a standard keyboard 100 while tab 24 extends into the space between adjacent keys, allowing key 102 having key mask 12 attached to be depressed without interfering with adjacent keys 102 on keyboard 100.

A pressure sensitive adhesive 36 is adhered to bottom surface 18 of face stock 14. Adhesive 36 is also removably adhered to a coating 34 on a liner 32, attaching face stock 14, and key masks 12 to liner 32. When the user desires to provide new indicators to the tops of keys 102 on a keyboard 100, key masks 12 are individually selected and removed from mask set 10. Tab 24 provides an easy means of grasping and initiating separation of each key mask 12 from liner 32. Tab 24 provides a convenient means of handling key mast 12 and locating it properly on key 102 of keyboard 100, permitting touchless location of key mask 12 on a key 102. This prevents contamination of adhesive 36 with the oils on the fingertips of the user.

Placement of key masks 12 on keyboard 100, provides numerous possibilities and benefits. In one embodiment, key mask 12 with graphical illustrations, both with and without alphabetic indicators, provide a tool for teaching children reading and typing. In another embodiment a blank mask set can be used to assist in the instruction of typing. In another embodiment non-alphabetic graphics can assist in the intermediate association with the location of the keys, to assist in the instruction of typing. Key masks 12 are easy to install and remove and will not damage keyboards 100 of the school.

In another embodiment, graphic illustrations 20 on individual key masks 12 represent distinct musical notes. This permits immediate association of the proper key 102 with a musical note, or a modifier of a note, such as flat, sharp, duration, of instrument played. This allows keyboard 100 to operate in much the same fashion as a synthesizer of other musical instrument, or alternatively, as a music composing device.

In another embodiment, graphic illustrations 20 on individual key masks 12 represent player controls over the game, such as weapon selection, and character movements. This embodiment permits immediate association of the proper key 102 with a desired control, allowing a player to learn new game controls quickly, and play more successfully, without the obstacle of unidentifiable controls within keyboard 100.

In another embodiment, graphic illustrations 20 on individual key masks 12 represent control actions for equipment or a system, such as: flow on, flow off, temperature up, temperature down. This embodiment permits immediate association of the proper key 102 with a desired equipment or system control, allowing an operator to use the computer and keyboard 100 as a programmable process controller or recorder, without the obvious safety concerns associated with an operator's inability to associate the proper key 102 with the proper control function.

While this invention has been described in connection with preferred embodiments, it is not intended to limit the scope of the invention to the particular form set forth, but to the contrary, it is intended to cover such alternatives, modifications, and equivalents as may be included within the spirit and scope of the invention as defined by the claims.

I claim:

1. A key mask for attaching to a key on a keyboard or keypad, comprising:
   a body that is substantially rectangular;
   a tab extending outward from a corner of the body;
   the body having a top surface and a bottom surface; and,
   a pressure sensitive adhesive adhered to the bottom surface.

2. The key mask of claim 1, further comprising:
   a graphic illustration on the top surface.

3. The key mask of claim 1, further comprising:
   the body being approximately 9/16 inches tall;
   the body being approximately ½ inches wide; and,
   whereas at least one of the corners of the body includes a radius.

4. The key mask of claim 1, further comprising:
the tab being between 0.110 and 0.140 inches wide;
the tab being between 0.110 and 0.140 inches long; and,
the end of the tab includes a radius.

5. The key mask of claim 1, further comprising:
the tab being substantially 0.125 inches wide;
the tab being substantially 0.125 inches long; and,
the end of the tab includes a radius.

6. The key mask of claim 1, whereas the tab extends from the upper right hand corner of the body of the key mask.

7. The key mask of claim 1, whereas the key mask is made from paper stock that has a basis weight between 50 and 70 pounds.

8. The key mask of claim 1, whereas the key mask is made from paper stock having a basis weight of 60 pounds.

9. The key mask of claim 1, whereas the key mask is made from lithographic paper stock having a matte finish.

10. The key mask of claim 1, whereas the key mask is made from lithographic paper stock having a caliper thickness of approximately 0.034 inches.

11. The key mask of claim 1, whereas the pressure sensitive adhesive is a clear acrylic removable adhesive having a high shear and high removable adhesion.

12. The key mask of claim 1, further comprising:
a liner coated with silicone on one side;
the silicone coated side of the liner adhered to the pressure sensitive adhesive.

13. The key mask of claim 12, whereas the liner is made from paper stock that has a basis weight between 90 and 120 pounds.

14. The key mask of claim 12, whereas the liner is made from paper stock that has a basis weight between 100 and 110 pounds.

15. The key mask of claim 12, whereas the liner is made from paper stock that has a caliper thickness of between 0.007 and 0.009 inches.

16. The key mask of claim 12, whereas the liner is made from paper stock that has a caliper thickness of 0.008 inches.

17. The key mask of claim 1, whereas the tab extends diagonally outward from a corner of the body of the key mask.

18. A mask set for attaching to keys on a keyboard or keypad, comprising:
a face stock having a top surface and a bottom surface;
a plurality of die-cut key masks located on the face stock;
each key mask having a body that is substantially rectangular and having a tab extending outward from a corner of the body;
at least one key mask having a graphic illustration on the top surface;
a pressure sensitive adhesive adhered to the bottom surface; and,
a coated liner adhered to the pressure sensitive adhesive.

19. The mask set of claim 18, whereas the graphic illustrations on individual key masks identify musical notes.

20. The mask set of claim 18, whereas the graphic illustrations on individual key masks represent distinct operator controlled actions related to a computer game.

21. The mask set of claim 18, whereas the graphic illustrations on individual key masks represent operative functions of a system or machine.

* * * * *